United States Patent
Van Zanten et al.

[11] Patent Number: 6,098,489
[45] Date of Patent: Aug. 8, 2000

[54] PUSH-ON ADJUSTABLE CABLE STRAND END-FITTING

[75] Inventors: David A. Van Zanten, Troy; J. Martin Nagle, Royal Oak; Michael J. Konn, Utica, all of Mich.

[73] Assignee: Nagle Industries, Inc., Clawson, Mich.

[21] Appl. No.: 09/250,478

[22] Filed: Feb. 15, 1999

[51] Int. Cl.[7] ........................................................ F16C 1/10
[52] U.S. Cl. ........................ 74/502.6; 74/502.4; 403/155
[58] Field of Search ................................. 74/502.6, 502.4, 74/500.4; 403/155

[56] References Cited

U.S. PATENT DOCUMENTS

| | | |
|---|---|---|
| 4,614,130 | 9/1986 | Heismann et al. . |
| 4,838,109 | 6/1989 | Stewart . |
| 4,887,930 | 12/1989 | Chaczyk et al. . |
| 5,293,785 | 3/1994 | Lichtenberg . |
| 5,295,408 | 3/1994 | Nagle et al. . |
| 5,518,332 | 5/1996 | Katoh .................................... 74/502.6 |
| 5,522,276 | 6/1996 | Lichtenberg . |
| 5,584,212 | 12/1996 | Wild . |
| 5,953,963 | 9/1999 | Wirsing et al. ........................ 74/502.4 |
| 6,021,689 | 2/2000 | Moore .................................... 74/502.6 |

*Primary Examiner*—David M. Fenstermacher
*Attorney, Agent, or Firm*—Dinnin & Dunn, P.C.

[57] ABSTRACT

A cable strand end-fitting having a housing which defines a longitudinal bore with internal threads to receive a screw member with external threads, the threads cooperate to allow axial movement of the screw member relative to the housing. A longitudinal passageway through the screw member receives a cable strand extending therethrough, one end of the cable strand is a terminal end bulb which abuts the screw member so the axial movement of the screw member adjusts the cable strand. The housing includes a mounting portion having a cylindrical opening generally perpendicular to the longitudinal bore, the cylindrical opening is adapted to be disposed over a mounting post along the longitudinal axis of the mounting post. A retainer clip secures the end-fitting to the mounting post with opposed locking teeth which are adapted to be positioned through diametrically opposed slots in the mounting portion of the housing thereby engaging the mounting post for securement.

16 Claims, 3 Drawing Sheets

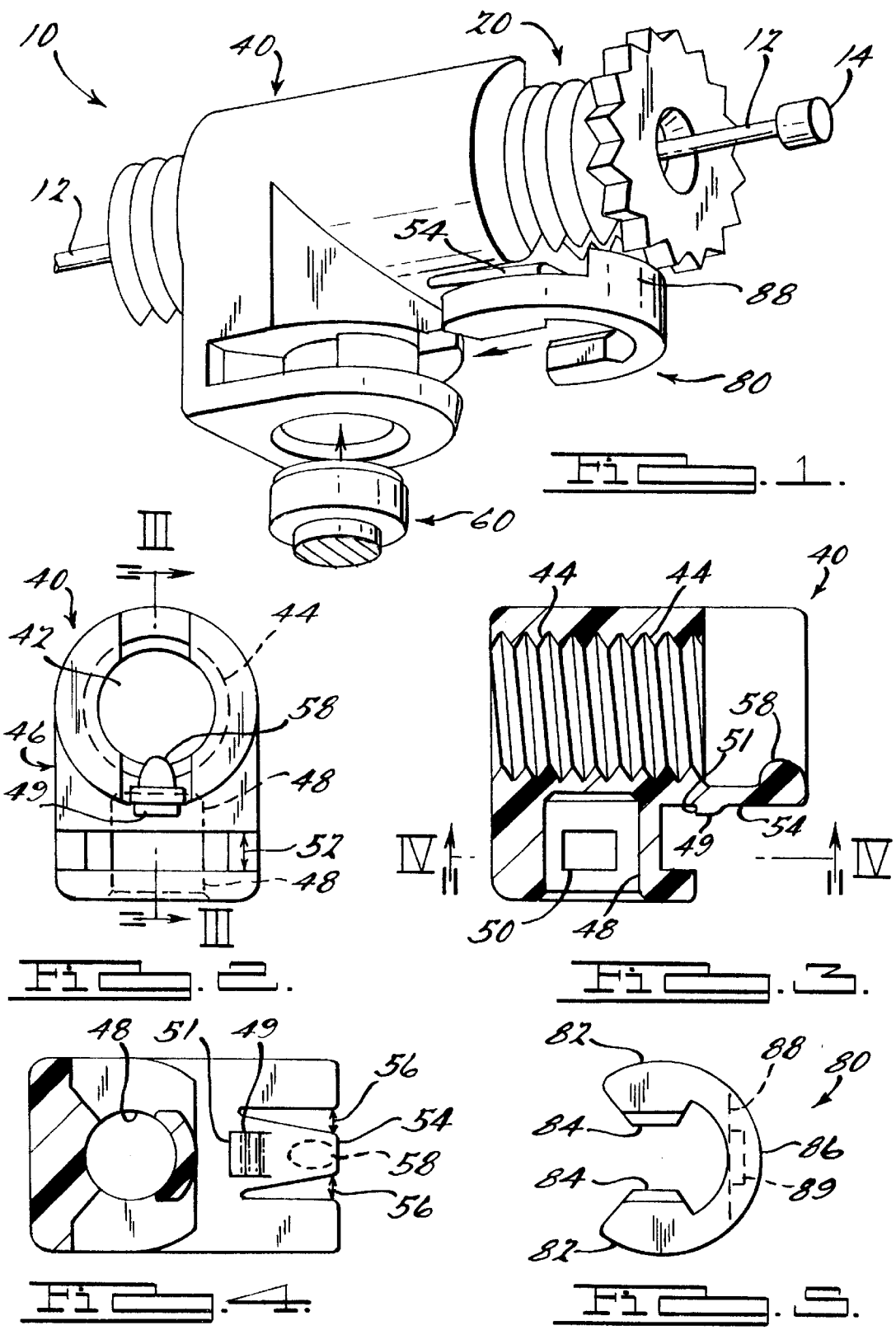

PUSH-ON ADJUSTABLE CABLE STRAND END-FITTING

BACKGROUND OF THE INVENTION

1. Field of the Invention

The present invention relates generally to cable end-fittings, and more particularly, to a cable end-fitting that anchors and adjusts a cable strand for a control cable assembly.

2. Description of Related Art

Control cable assemblies are used in any industrial field where there is a need to enable a device at one end of the assembly to move when the opposite end of the assembly is moved to a selected position. For example, in the automotive industry, one end of a control cable assembly is used to move a throttle lever of a carburetor when the opposite end, the accelerator pedal, is depressed. Other mechanical equipment using control cable assemblies to transmit a force through a cable are motorcycles, boats, snowmobiles and construction equipment. However, these are only typical examples, and control cable assemblies, including the present invention, are not limited to the cited examples.

Control cable assemblies utilize an end-fitting to accomplish moving a device at one end of the assembly. Typically, the end-fitting is attached to the moveable device and a cable strand slidably cooperates through the end-fitting with one end of the cable stand having a terminal end bulb to prevent the cable strand from exiting the end-fitting. For example, a temperature control lever within a vehicle is moved to a selected position marked for defrosting, heating or air conditioning. The control lever moves one end of a cable strand which slidingly cooperates and is maintained at the other end to an end-fitting. The end-fitting is typically mounted to a mounting post, which in this example would be integral with a baffle member, such that movement of the temperature control lever will move the end-fitting, mounting post and baffle to direct air flow as selected by the user.

Accordingly, the mounting post and end-fitting are designed to rotate when the cable is pulled thereby actuating a mechanism, maybe a baffle for air flow selection or a throttle lever for fuel flow control. Typically, the mounting post extends longitudinally perpendicular to the rotational plane and the end-fitting mounts the stem of the mounting post transversely relative to the longitudinal axis. Examples of the relevant art using this mounting design are: (1) U.S. Pat. Nos. 5,293,785 and 5,522,276 both to Lichtenberg; (2) U.S. Pat. No. 5,295,408 to Nagle et al.; (3) U.S. Pat. No. 5,584,212 to Wild.

This design necessitates a mounting technique that requires the direction of the mounting force to be in the same plane as the rotational plane. Consequently, as an assembler proceeds to mount the end-fitting onto the mounting post, the force applied by the hand being in the same direction rotates the mounting post away from the hand and end-fitting. This creates a mounting procedure that is difficult to perform properly which can have dire consequences, explained subsequently. Considering the typical time constraints of a vehicle assembly line and space constraints of a typical engine compartment, the mounting problem is greatly compounded.

If the end-fitting is not properly secured to the mounting post, the end-fitting will eventually disengage from the mounting post rendering the mechanism to be controlled by the cable assembly inoperable. Returning to the control cable assembly example for a carburetor, a scenario can readily be presented to demonstrate the importance of having an end-fitting design that solves the mounting problem. Imagine an end-fitting for the throttle lever of a carburetor for an automobile which is not adequately secured to the mounting post. You are driving the vehicle in a normal fashion along a two-way highway with only two lanes. In front of you is a slow moving diesel truck pulling a tractor-trailer and behind you are several vehicles following you. You decide to pass the diesel truck and move into the lane of on-coming traffic. To increase speed, you apply pressure to the accelerator pedal which moves the cable strand to rotate the carburetor lever thereby increasing the fuel flow to the engine. The increased force causes the improperly secured end-fitting to disengage from the throttle lever leaving you without any control to move the vehicle. You are left coasting in the lane of on-coming traffic with only the ability to steer. As a vehicle approaches from the opposite direction, you attempt to coast back into your original position assuming the position is not blocked by the vehicles originally behind you, but the maneuver is impossible because you lack the ability to accelerate the vehicle into position. Stranded in the wrong lane with on-coming traffic bearing down on you, you will be fortunate if a collision can be avoided. Clearly, the mounting problem needs to be rectified. Accordingly, there has been a long felt need in the industry, particularly the last five to ten years, to design an end-fitting for a control cable that can easily be properly secured to the mounting post and allows an assembler to quickly make the determination that the end-fitting is secure.

Wherefore, it is an object of the present invention to provide a cable strand end-fitting designed to be positioned onto a mounting post along the longitudinal axis of the mounting post.

Another object of the present invention is to provide a cable strand end-fitting capable of adjusting the cable strand.

Still another object of the present invention is to provide a cable strand end-fitting designed to snap into place providing a feedback to the hand of an assembler.

Yet another object of the present invention is to provide a cable strand end-fitting designed such that the insertion force necessary to mount the end-fitting is less than the extraction force.

And still another object of the present invention is to provide a cable strand end-fitting designed such that the means to secure the end-fitting to the mounting post is a separate member.

A further object of the present invention is to provide a cable strand end-fitting designed such that the force needed to disengage the end-fitting from the mounting post may be adjusted without redesigning the end-fitting (housing).

SUMMARY OF THE INVENTION

According to the present invention, the foregoing and other objects and advantages are attained by a cable strand end-fitting with a housing that includes a mounting portion having a cylindrical opening adapted to receive a mounting post along the longitudinal axis of the mounting post. As the housing is installed over the mounting post, an integrated retainer clip automatically secures the end-fitting to the mounting post. The mounting post includes a stem portion below a head portion, and the head portion has a diameter greater than the stem portion.

The retainer clip has resilient limbs with inside surfaces defining opposed locking teeth which are adapted to be positioned through diametrically opposed slots in the mounting portion of the housing. As the end-fitting is mounted onto the mounting post, the limbs of the retainer clip spread apart to allow the locking teeth to accommodate the diametric dimension of the head portion. Continued axial movement of the end-fitting snaps the limbs back into the original position with the locking teeth resting against the smaller dimensioned stem portion. Since the distance between the two locking teeth is smaller than the diameter of the head portion, the locking teeth prevent the end-fitting from disengaging the mounting post.

Several advantages of the present invention result from securing the end-fitting along the longitudinal axis of the mounting post. One, since the longitudinal axis of the mounting post is typically perpendicular to the rotational plane of the mechanism actuated by pulling the cable, the direction of the force to mount the end-fitting is necessarily perpendicular to the rotational plane. Accordingly, the mounting post does not rotate away from the hand during the mounting procedure because the mounting post is generally static along the longitudinal axis. Being stationary in the mounting direction, a reactionary feedback force is established back into the hand of an assembler during the mounting procedure to help the assembler "feel" when the end-fitting is properly mounted to the mounting post.

A second advantage of having the mounting direction aligned with the longitudinal axis of the mounting post is only one hand is needed to mount the end-fitting. A one handed mounting procedure is obviously a simpler task as opposed to the relevant art designs which may require a second hand to impede rotation of the mounting post. The simpler mounting procedure means less time and space (for example, an engine compartment) are needed to accommodate the mounting procedure. Time and compartment space are critical variables on most assembly lines.

A third advantage of mounting the end-fitting along the longitudinal axis of the mounting post is the hand motion is a push-on motion which is more ergonomically sound than the mounting motion transverse to the mounting post. The push-on motion minimizes the stress and strain on the arm and wrist because there is no force tending to twist the wrist. This is an important consideration given the repetitive motion on an assembly line where each task is routinely performed every fifty seconds or so.

Another advantage of the present invention is the means to secure the end-fitting to a mounting post is a separate member: a retainer clip. Accordingly, if the holding power (i.e. the force necessary to disengage the end-fitting from the mounting post) of the end-fitting requires adjusting, only the retainer clip needs to be redesigned to accomplish the adjustment as opposed to redesigning the end-fitting. The retainer clip is a simple C-shape configuration easily redesigned while the end-fitting is a more substantial housing design which would be a more expensive and time consuming endeavor to redesign.

Yet another advantage of the retainer clip being a separate member is the fact the end-fitting and retainer clip can consist of different materials. For example, if the retainer clip needs to be more durable in a certain environment, the retainer clip could be formed from metal while the end-fitting could be a durable plastic, or vice versa.

Additional objects, advantages, and novel features of the present invention will be set forth in part in a description which follows, and in part will become apparent to those skilled in the art upon examination of the following specification and drawings, or may be learned by the practice of the invention herein. The object and advantages of the present invention may be realized and attained by means of the instrumentalities and combinations particularly pointed out in the appended claims.

BRIEF DESCRIPTION OF THE DRAWINGS

FIG. 1 is an exploded perspective view of the cable strand end-fitting according to the present invention.

FIG. 2 is a front elevational view of the housing for the cable strand end-fitting.

FIG. 3 is a sectional view of the housing taken along line III—III of FIG. 2.

FIG. 4 is a sectional view of the housing taken along line IV—IV of FIG. 3.

FIG. 5 is a bottom plan view of the retainer clip for the cable strand end-fitting.

Figure 6:
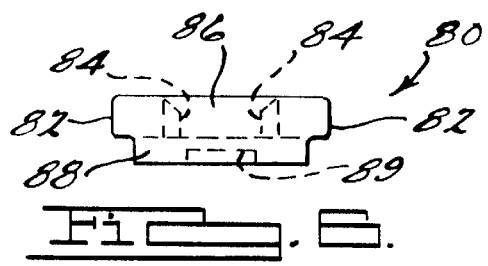
FIG. 6 is a front elevational view of the retainer clip.

BEST MODE OF CARRYING OUT THE INVENTION AND A DESCRIPTION OF THE PREFERRED EMBODIMENT(S)

Referring to FIG. 1, an adjustable cable strand end-fitting 10 (hereinafter "end-fitting") according to the present invention is shown. The end-fitting is adapted to cooperate with a motion control cable assembly (not shown) having a strand or cable 12 slidably disposed within the end-fitting 10 with a terminal end bulb 14 attached to the distal end of the strand 12 thereby preventing the strand 12 from exiting the end-fitting 10. The other end of the strand 12 is attached to a moveable operator pedal or control mechanism (not shown), such as an accelerator pedal, temperature control lever or cruise control servo motor (none shown). It should be appreciated that the strand 12 moves the end-fitting once the operator mechanism is actuated.

The cable strand end-fitting 10 includes a screw member, generally indicated at 20, adapted to receive the strand 12, and a housing, generally indicated at 40, adapted to cooperate with the screw member 20. The housing 40 is adapted to be removably secured to a mounting post, generally indicated at 60. A retainer clip, generally indicated at 80, is adapted to cooperate with the housing 40 and the mounting post 60 to secure the end-fitting 10 to the mounting post 60 along the longitudinal axis of the mounting post 60. While the screw member 20, housing 40, and retainer clip 80 may be made of a plastic material such as polycarbonate, it should be appreciated the members may be made of any suitable material such as metal, or other durable plastic. Furthermore, it should also be appreciated that each member can be made from any combination of suitable materials, i.e., the screw member and housing may be made of plastic while the retainer clip is metal.

Figure 11:
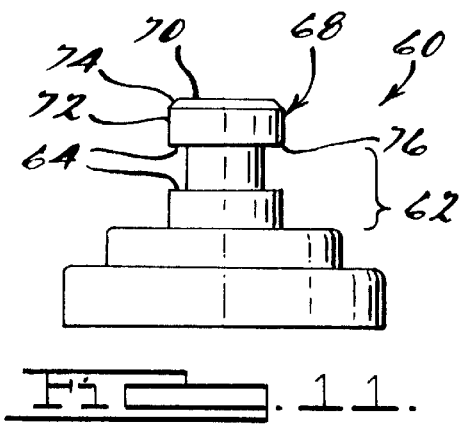
FIG. 11 is side view of the mounting post adapted for the end-fitting of the present invention.

As illustrated in FIG. 11, a mounting post 60 has an axle post design unlike a large nail head design common in the relevant art. The axle post design has a stem portion 62 with a circumferential groove 64 and a head portion 68. The head portion 68 is oriented at the distal end of the axle design with the circumferential groove 64 adjacent the head portion 68. The circumferential groove 64 has a diameter smaller than the diameter of the head portion 68. The head portion 68 includes a flat top surface 70 and perpendicular side surface 72 with an intermediate surface 74 that is angled relative to the top 70 and side surface 72. It should be understood that this surface configuration establishes deformation condition (as opposed to a shearing condition established by perpendicularly intersecting sides) when inserting the end-fitting 10 onto the mounting post 60 lessening the force required to perform the task. It should also be understood that the intermediate surface 74 may be sloped or beveled as long as a deformation condition is established. The side surface 72 forms generally a right-angled edge 76 with the circumferential groove 64 to establish a shear condition once the end-fitting 10 is mounted thereby increasing the force necessary to remove the end-fitting from the mounting post relative to the insertion force.

Figure 8:
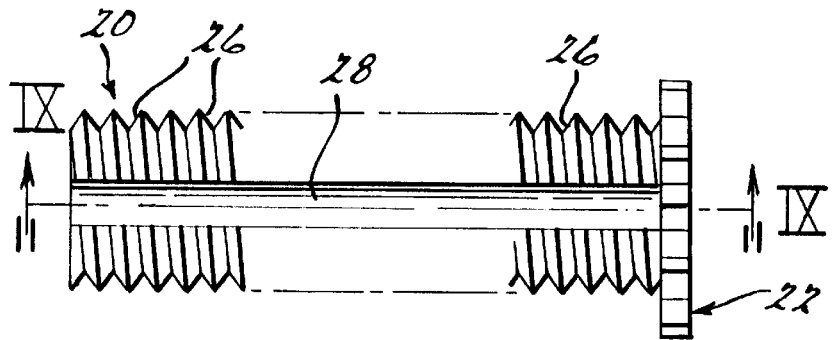
FIG. 8 is a side view of the screw member for the cable strand end-fitting.
Figure 9:
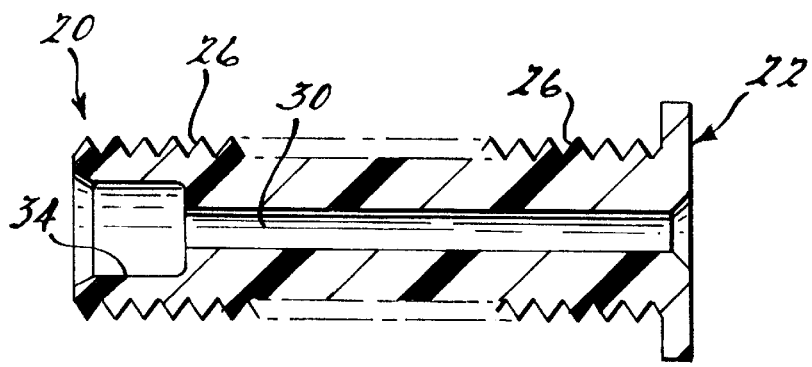
FIG. 9 is a sectional view of the screw member taken along line IX—IX of FIG. 8.
Figure 10:
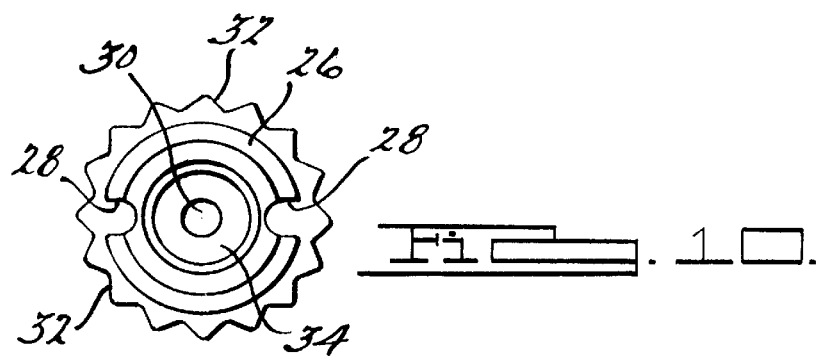
FIG. 10 is a rear view of the screw member along the longitudinal axis of FIG. 8.

As illustrated in FIGS. 8–10, the screw member 20 has a serration portion 22 and a body portion 24 extending longitudinally from the serration portion 22. The body portion 24 is generally cylindrical in shape and has a plurality of exterior threads 26. The body portion 24 also has at least one, preferably a pair of longitudinal grooves 28 that diametrically oppose each other and extend along the length of the body portion 24. The longitudinal grooves 28 interrupt the threads 26 such that the threads 26 are not continuous. The serration portion 22 is enlarged for finger engagement with a diameter greater than the body portion 24. The serration portion 22 includes a plurality of serrations 32 extending radially. The screw member 20 also includes a passageway 30 extending longitudinally throughout. The passageway 30 has larger dimensions generally at 34 adapted to receive a larger terminal and bulb 14. However, it should be appreciated a terminal end bulb 14 may abut either end of the screw member 20. It should also be appreciated that the strand 12 extends through the passageway 30.

As illustrated in FIGS. 2–4, the housing 40 is generally cylindrical in shape and includes a bore 42 extending longitudinally throughout. The housing 40 includes a plurality of internal threads 44 extending partially along the bore 42. The threads 44 are adapted to cooperate with the threads 26 of the screw member 20. The housing 40 also includes a mounting portion 46 adapted to be mounted or attached to the mounting post 60. The mounting portion 46 extends generally perpendicular to the bore 42 and defines a cylindrical opening 48. The cylindrical opening 48 also extends perpendicularly to the bore 42 and is adapted to receive the mounting post 60 to allow the end-fitting 10 to rest on the mounting post 60 capable of swiveling in a plane perpendicular to the longitudinal axis. The mounting portion 46 also includes diametrically opposed slots 50 extending through the mounting portion 46 and communicating with the cylindrical opening 48. A C-shaped groove 52 on the exterior of the mounting portion 50 connects the slots 50.

The cylindrical opening 48 is adapted to rest atop the mounting post 60 so the slots 50 are positional laterally adjacent the circumferential groove 64 of the mounting post 60. The housing 40 includes a finger 54 formed by a pair of slots 56 extending inwardly into the housing 40 such that the finger 54 is supported in a cantilevered manner. The finger 54 is deflectable and oriented at one end of the housing 40. The finger 54 includes a projection 58 extending radially into the bore 42 and adapted to cooperate with the grooves 26 of the screw member 20. A detent 49 extends from the housing 40 rearward of the finger 54 and adjacent the mounting portion 46 and adapted to cooperate with the retainer clip 80.

Figure 7:
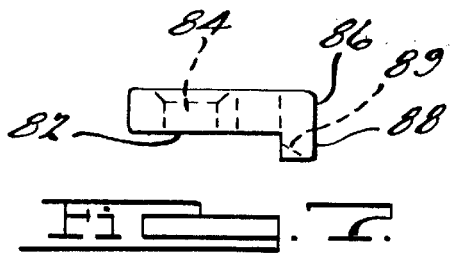
FIG. 7 is a side elevational view of the retainer clip.

As illustrated in FIGS. 5–7, the retainer clip 80 is generally planar and C-shaped with two resilient limbs 82. The limbs 82 have inside surfaces each defining a locking tooth 84 projecting toward the other. The locking teeth 84 are adapted to be positioned through the diametrically opposed slots 50 in the mounting portion 46 of the housing 40. The arcuate segment 86 of the retainer clip 80 connecting the limbs 82 has a wall 88 rising generally perpendicular to the planar design of the retainer clip 80 and adapted to cooperate with the detent 49 of the housing 40. A sloping surface 89 in the wall 88 facilitates the cooperation with the detent 49.

Figure 12:
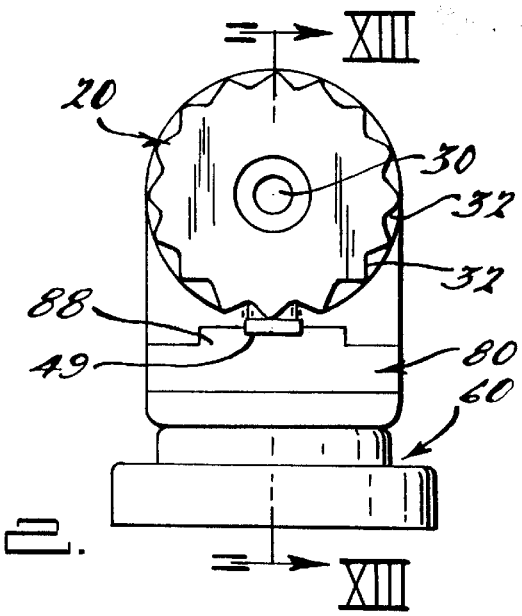
FIG. 12 is a front view of the end-fitting secured to the mounting post of FIG. 11 by the retainer clip.
Figure 13:
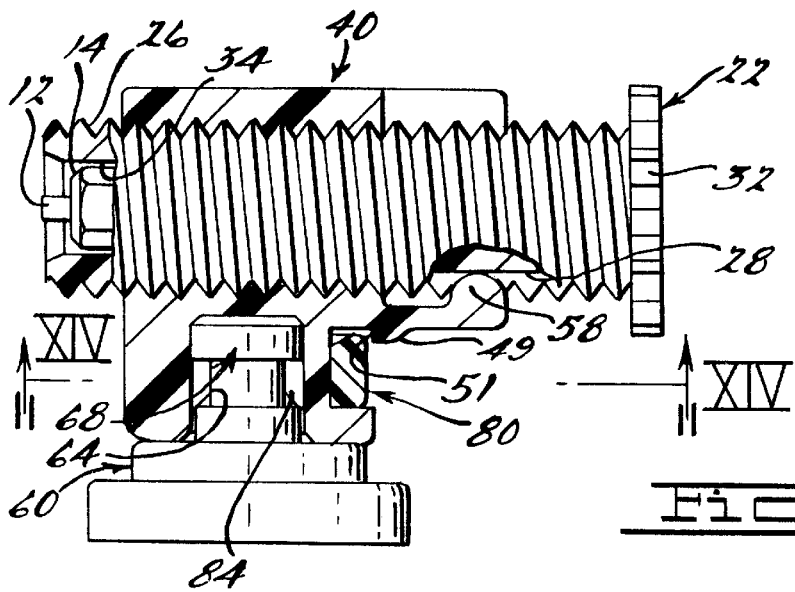
FIG. 13 is a side view of the mounted end-fitting in FIG. 12 with a sectional view of the housing taken along line XIII—XIII of FIG. 12 and two partially broken away side views of the screw member.
Figure 14:
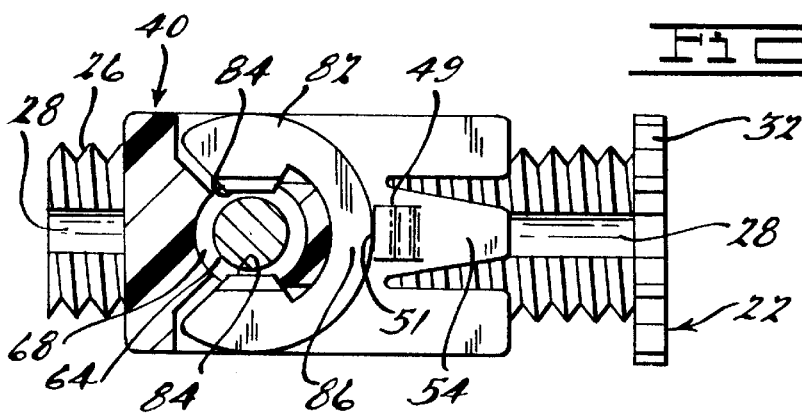
FIG. 14 is a sectional view of FIG. 13 taken along line XIV—XIV.

As illustrated in FIGS. 12–14, in operation, the retainer clip 80 is positioned in the C-shaped groove 52 of the mounting portion 46 by first sliding the locking teeth 84 inside the C-groove 52. The resilient limbs 82 will spread apart to accommodate the larger dimensioned C-groove 52 until the locking teeth 84 reach the diametrically opposed slots 50 snapping into the slots 50 and facing each other inside the cylindrical opening 48. In this position, the retainer clip 80 is aligned in the C-groove 52 oriented perpendicular to the longitudinal axis of the cylindrical opening 48 and the wall 88 has engaged and moved past the detent 49 so the wall 88 generally faces a parallel wall 51 of the detent 49 thereby maintaining the retainer clip 80 inside the C-groove 52 of the housing 40. The distance between the locking teeth 84 inside the cylindrical opening 48 is smaller than the diameter of the head portion 68 of the mounting post 60.

The cable strand 12 extends through the passageway 30 of the screw member 20 with the terminal end bulb 14 abutting either the body portion 24 or serration portion 22. It should be understood the passageway 30 at either end could include an enlarged diameter 34 extending partially into the screw member 20 adapted to accommodate receiving the terminal end bulb 14. The screw member 20 is moved longitudinally into the bore 42 of the housing 40 such that the projection 58 of the finger 54 travels along one of the longitudinal grooves 28 of the screw member 20. When the end of the body portion 24 reaches the threads 44 of the housing 40, the screw member 20 is rotated such that the threads 26 of the screw member 20 mesh with the threads 44 of the housing 40.

To mount the end-fitting 10, the cylindrical opening 48 is positioned over the mounting post 60 until the locking teeth 84 engage the head portion 68. A force is applied to the end-fitting 10 and directed along the longitudinal axis of the mounting post 60 to overcome the deformation condition established between the locking teeth 84 of the retainer clip 80 and the intermediate surface 74 of the head portion 68. The locking teeth 84 ride along the intermediate surface 74 spreading the resilient limbs 82 of the retainer clip 80 until the locking teeth 84 spread apart laterally to accommodate the diameter dimensions of the side surface 72 of the head portion 68. The locking teeth 84 ride along the side surface 72 until reaching the circumferential groove 64 where the resilient limbs 82 snap back into a non-deformed state with the locking teeth 84 resting inside the circumferential groove 64 of the mounting post 60. In this position, the distance between the locking teeth 84 is smaller than the diameter of the head portion 68 creating a shearing condition thereby securing the end-fitting 10 to the mounting post 60.

Referring to FIG. 13, upon rotation of the screw member 30, the projection 58 of the finger 54 engages the threads 26 of the screw member 20 and moves the finger 54 radially. As a result, the projection 58 moves out of the longitudinal groove 28 and rides along the threads 26 until reaching the next longitudinal groove 28 and is disposed therein. It should be appreciated that when the projection 58 is disposed in either longitudinal groove 28, rotation between the screw member 20 and housing 40 is resisted. It should also be appreciated that since one end of the strand 12 is fixed, rotating the screw member 20 moves the screw member 20 axially either toward or away from the terminal end bulb 14 until the desired tension or slack is achieved.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An end-fitting for a control cable assembly comprising:

a housing adapted to secure one end of a cable strand to said housing, said housing including a cylindrical opening to receive a mounting post along the longitudinal axis of the mounting post, said housing further including at least one slot extending through the housing and communicating with the cylindrical opening; and a retainer clip having at least one locking took adapted to cooperate through the slot of the housing and engage said mounting post to secure the end-fitting to the mounting post, and wherein said housing includes a longitudinal bore defining a plurality of internal threads extending partially therethrough, the housing further includes a mounting portion defining the cylindrical opening generally perpendicular to the longitudinal bore;

a rotatable screw member defining a longitudinal passageway to receive the cable strand, said screw member having a plurality of external threads adapted to cooperate with the internal threads of the housing to move the screw member axially through the longitudinal bore of the housing; and a terminal end bulb attached to the end of the cable strand to abut the screw member preventing the cable strand from exiting the longitudinal passageway.

2. The end-fitting according to claim 1 wherein said retainer clip includes two opposed locking teeth, said housing includes two slots extending through the housing and communicating with the cylindrical opening, said slots are diametrically opposed in said cylindrical opening, said locking teeth adapted to cooperate through the slots and protrude into the cylindrical opening.

3. The end-fitting according to claim 2 wherein said retainer clip is generally planar and C-shaped with two resilient limbs, said limbs having inside surfaces defining the opposed locking teeth.

4. The end-fitting according to claim 3 wherein said retainer clip further includes an arcuate segment connecting the two limbs, said arcuate segment includes a wall extending generally perpendicular from the planar retainer clip, said housing further includes a detent adapted to cooperate with the wall to prevent the retainer clip from disengaging the housing.

5. The end-fitting according to claim 2 wherein said mounting post is generally cylindrical defining a head portion at the distal end of said mounting post and a stem portion adjacent the head portion, the stem portion further includes a circumferential groove having a diameter smaller than the diameter of the head portion, said locking teeth engage the mounting post by resting inside the circumferential groove.

6. The end-fitting according to claim 5 wherein said head portion has a flat, top surface perpendicular to a side cylindrical wall, a second surface connects the top surface to the side wall and angled relative to each, said side wall defines generally a right angle with the circumferential groove.

7. The end-fitting according to claim 1 wherein said mounting portion defines a partial perimeter groove connecting the slots, said perimeter groove adapted to receive said retainer clip;

said housing further includes a means to prevent the retainer clip from disengaging the housing; and said screw member further includes a pair of opposed grooves extending longitudinally through the external threads and a finger extending longitudinally from said housing and having a projection engageable with at least one of said grooves to resist rotation of said screw member relative to said housing.

8. The end-fitting according to claim 7 wherein said retainer clip is generally planar and C-shaped with two resilient limbs, said limbs having inside surfaces defining the opposed locking teeth.

9. The end-fitting according to claim 8 wherein said retainer clip further includes an arcuate segment connecting the two limbs, said arcuate segment includes a wall extending generally perpendicular from the planar retainer clip, said housing further includes a detent adapted to cooperate with the wall to prevent the retainer clip from disengaging the housing.

10. An end-fitting for a control cable assembly comprising:

a housing adapted to secure one end of a cable strand to said housing, said housing including a cylindrical opening to receive a mounting post along the longitudinal axis of the mounting post, said housing further including two diametrically opposed slots extending through the housing and communicating with the cylindrical opening; and a retainer clip including two opposed locking teeth, said locking teeth adapted to cooperate through the slots of the housing and protrude into the cylindrical opening, and wherein said housing includes a longitudinal bore defining a plurality of internal threads extending partially therethrough, the housing further includes a mounting portion defining the cylindrical opening generally perpendicular to the longitudinal bore;

a rotatable screw member defining a longitudinal passageway to receive the cable strand, said screw member having a plurality of external threads adapted to cooperate with the internal threads of the housing to move the screw member axially through the longitudinal bore of the housing; and a terminal end bulb attached to the end of the cable strand to abut the screw member preventing the cable strand from exiting the longitudinal passageway.

11. The end-fitting according to claim 10 wherein said mounting portion defines a partial perimeter groove connecting the slots, said perimeter groove adapted to receive said retainer clip; and said screw member further includes a pair of opposed grooves extending longitudinally through the external threads, said housing includes a finger extending longitudinally and having a projection engageable with at least one of said grooves of the screw member to resist rotation of said screw member relative to said housing.

12. An end-fitting for a control cable assembly comprising:

a housing adapted to secure one end of a cable strand to said housing, said housing including a mounting portion defining a cylindrical opening to receive a mounting post along the longitudinal axis of the mounting post, said mounting portion further including two diametrically opposed slots extending through the mounting portion and communicating with the cylindrical opening and each slot connected by a perimeter groove defined by the mounting portion;

a planar retainer clip generally C-shaped to be secured in the perimeter groove of the mounting portion, said retainer clip including two resilient limbs, each limb having inside surfaces defining opposed locking teeth adapted to cooperate through the slots of the mounting portion and protrude into the cylindrical opening, said retainer clip further including an arcuate segment connecting the two limbs, said arcuate segment defining a wall extending perpendicularly from the planar retainer clip; and said housing further including a detent to cooperate with the wall of the retainer clip to prevent said retainer clip from disengaging the mounting portion, and wherein said housing includes a longitudinal bore defining a plurality of internal threads extending partially therethrough, the cylindrical opening of the mounting portion generally perpendicular to the longitudinal bore;

a rotatable screw member defining a longitudinal passageway to receive the cable strand, said screw member having a plurality of external threads adapted to cooperate with the internal threads of the housing to move the screw member axially through the longitudinal bore of the housing;

said screw member further includes a pair of opposed grooves extending longitudinally through the external threads and a finger extending longitudinally from said housing and having a projection engageable with at least one of said grooves to resist rotation of said screw member relative to said housing; and a terminal end bulb attached to the end of the cable strand to abut the screw member preventing the cable strand from exiting the longitudinal passageway.

13. The end-fitting according to claim 12 wherein said retainer clip includes a plurality of opposed locking teeth, said housing includes at least a slot extending through the housing and communicating with the opening, said slot being in opposed position within said opening, said locking teeth adapted to cooperate through the slot and protrude into the opening.

14. The end-fitting according to claim 13 wherein said retainer clip is generally planar and C-shaped with two resilient limbs, said limbs having inside surfaces defining the opposed locking teeth.

15. The end-fitting according to claim 12 wherein said retainer clip further includes an arcuate segment connecting the two limbs, said arcuate segment includes a wall extending generally perpendicular from the planar retainer clip, said housing further includes a detent adapted to cooperate with the wall to prevent the retainer clip from disengaging the housing.

16. The end-fitting according to claim 12 wherein said mounting post is generally cylindrical defining a head portion at the distal end of said mounting post and a stem portion adjacent the head portion, the stem portion further includes a circumferential groove having a diameter smaller than the diameter of the head portion, said locking teeth engage the mounting post by resting inside the circumferential groove.

* * * * *